Patented Feb. 8, 1927.

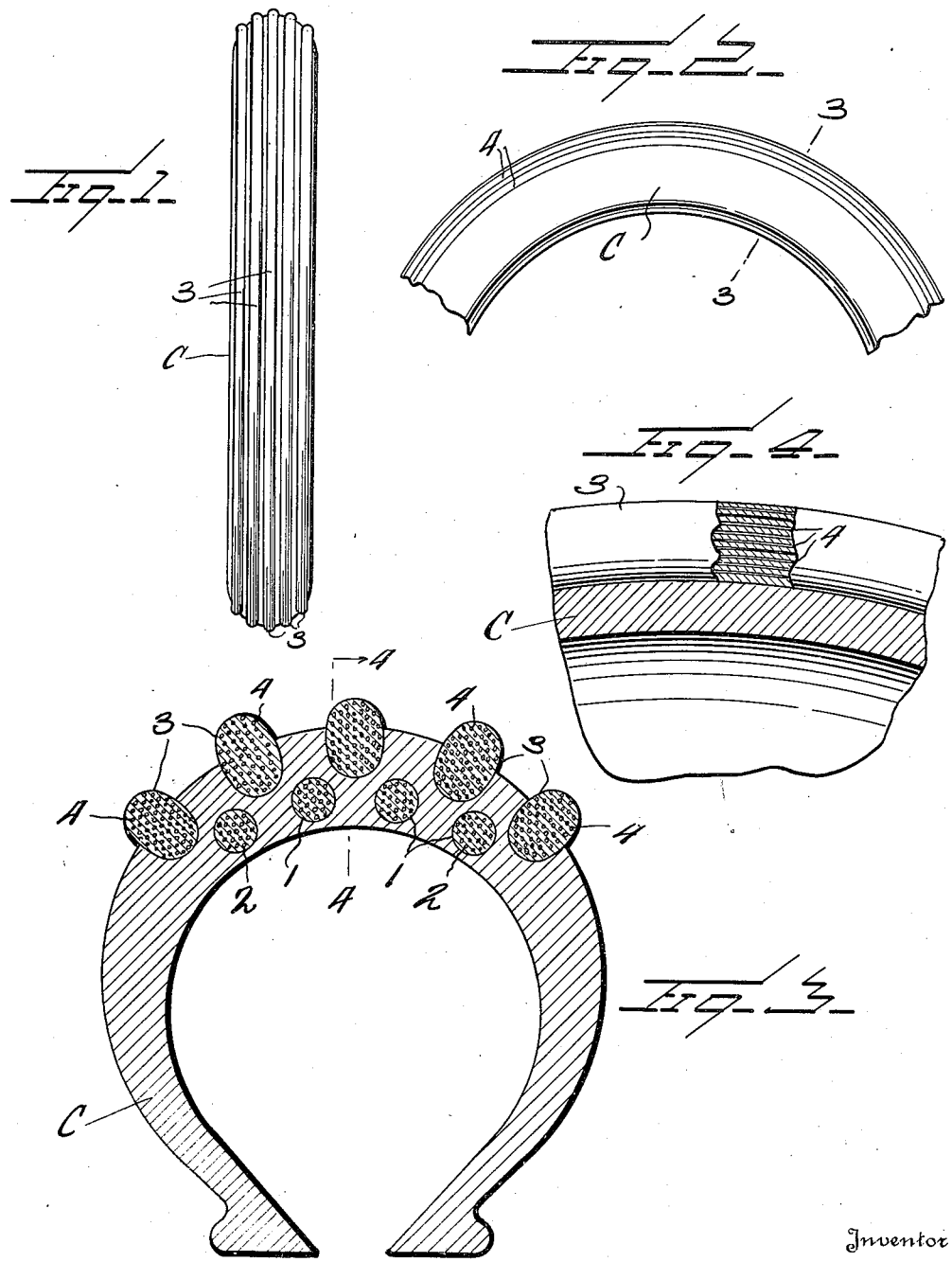

1,616,543

UNITED STATES PATENT OFFICE.

BUNNOSUKE OMOTO, OF GREEN RIVER, WYOMING.

TIRE CASING.

Application filed January 7, 1926. Serial No. 79,832.

This invention relates to certain improvements in tire casings and it is an object of the invention to provide a casing constructed in a manner whereby it will be of pronounced strength and also builded in a manner to effectively grip the surface over which it may traverse.

The invention consists in the details of construction and in the combination and arrangement of the several parts of my improved tire casing whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation illustrating a tire casing constructed in accordance with an embodiment of my invention;

Figure 2 is a fragmentary view in side elevation of the structure as illustrated in Figure 1;

Figure 3 is an enlarged sectional view taken substantially on the line 3—3 of Figure 2;

Figure 4 is an enlarged fragmentary sectional view taken substantially on the line 4—4 of Figure 3.

The body proper of the casing C is molded in a well known manner from a conventional rubber compound, preferably black, and during the molding operation, the tread portion of the body of the casing C adjacent its inner face has molded therein the circumferentially disposed and transversely spaced bands 1 of rubber, preferably circular in cross section, and which contain the reinforcing cords 2 extending therearound and in a circumferential direction. The outer surface of the tread portion of the body of the casing also has molded therein the circumferentially disposed and transversely spaced bands 3 of rubber reinforced by the cords 4, said bands 3 having their outer portions projecting beyond the outer surface of the tread portion of the body of the casing in order to increase the gripping action of the casing when in transit. These bands 3 are preferably of a color, such as white, different than the color of the casing C in order to increase the esthetic value of the casing and particularly to give a pronounced or conspicuous identity to the casing so that the type of the tire may be readily observed both when the vehicle with which it is employed is in motion or at rest.

The bands 3 are of an uneven number with the central band arranged at the transverse center of the tread of the casing C. The bands 1 are of an even number and each of said bands is arranged substantially midway between a pair of adjacent bands 3. The bands 1 are substantially equi-distantly spaced as are also the bands 3.

From the foregoing description it is thought to be obvious that a tire casing constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In combination with a tire casing, a plurality of circumferentially disposed and transversely spaced reinforcing bands embedded within the inner part of the tread portion of the casing, said bands being of even number and equi-distantly spaced, and a second series of circumferentially disposed and transversely spaced bands partially embedded in the outer surface of the tread portion of the casing, said last named bands being of an uneven number and equi-distantly spaced, the central one of said last named bands being positioned at substantially the transverse center of the tread of the casing, each of the first named bands being arranged substantially midway between a pair of adjacent second named bands.

In testimony whereof I hereunto affix my signature.

BUNNOSUKE OMOTO.